May 21, 1935. T. F. YAGLE Re. 19,574

PROJECTION SCREEN

Original Filed Oct. 16, 1929

Theodore F. Yagle
INVENTOR

BY John Dabis, Jr.
ATTORNEY

Reissued May 21, 1935 Re. 19,574

UNITED STATES PATENT OFFICE 19,574

PROJECTION SCREEN

Theodore F. Yagle, Philadelphia, Pa., assignor to Radio Corporation of America, New York, N. Y., a corporation of Delaware Original No. 1,876,269, dated September 6, 1932, Serial No. 400,109, October 16, 1929. Application for reissue August 22, 1933, Serial No. 686,228

8 Claims. (Cl. 88—24)

My invention relates to sound and/or motion picture apparatus, and more particularly to a screen therefor, whereon motion pictures or still transparencies and the like are projected by means of a film traversing light beam.

In accordance with my invention, I provide an improved projection screen whereby superior results are obtained in viewing thereon motion or still pictures, photographs, transparencies and the like, and which, in one form of the invention, consists of a base or backing of any knitted or woven material such as cotton for example, having a "pile" facing or "nap" intermeshed with or otherwise secured to the said backing, and consisting of single curly fibers of wool or the like, which are interrelated or tangled similarly to a material commercially known as "Eiderdown" and with the fibrous "pile" or "nap" facing of a thickness greater than twice the total thickness of the said backing.

The thickness of the fibrous "pile" or "nap" facing is governed in certain predetermined instances by the distance from which projected film subject matter or the like is to be viewed.

Further in accordance with my invention, I provide an improved screen for talking and/or motion picture apparatus, which is particularly adapted to visually impart to such pictures the effect of rotundity with a certain amount of depth, generally referred to as perspective, as distinguished from the conventional screen with its strictly flat surface resulting in a "flat" picture effect.

Further in accordance with my invention, I provide an improved projection screen which is substantially semi-transparent, in order to partially absorb the rays of light when projected thereon, and to the extent that reflection of light rays therefrom is largely prevented and therewith the usual "screen glare".

Further in accordance with my invention, I provide an improved projection screen which presents a foraminated, substantially flat "pile" facing or "nap" to a film traversing light beam although permitting, due to said formated "pile" facing, the portrayal of certain parts or portions of motion film subject matter in substantially one or more parallel planes, by reason of the fact that, when a light beam is projected thereon, the said light beam will penetrate the "pile" facing indiscriminately to the total depth thereof.

Further in accordance with my invention, I utilize a foraminated projection screen which will, in addition to visually giving the effect of rotundity to pictures or scenes projected thereon, whether they be still or in motion, permit sound waves to penetrate the screen as is necessary when talking motion pictures are being exhibited.

Further in accordance with my invention, I provide a projection screen of the character described, which will substantially damp out all extraneous sounds resulting from the operation of talking motion picture apparatus and emanating from a sound reproducing instrumentality used in conjunction therewith, and usually situated to the rear of the conventional type of projection screen. Such extraneous sounds, in the case of special sound record tablets for synchronous reproduction with motion picture films, or, photographically recorded sound synchronized on motion film strips in conjunction with the usual pictures or the like, for example, are commonly referred to in the art as "surface noise", the former being due to a stylus carried by a sound reproducing instrumentality tracking the sound groove on such record tablets, and, in the case of the latter example, to the granular structure of and the foreign matter usually on photographic sound film when traveling past a "light slit" in reproducing apparatus therefor.

Further in accordance with my invention, a suitably proportioned sheet or section of foraminated fabric known to the textile trade as cotton back, single faced "Eiderdown" is utilized for my improved projection screen, with the "Eiderdown" or "pile" facing of said fabric arranged to face a moving picture projector, so that a light beam emanating therefrom, will impinge on the said "pile" facing and penetrate the same, to the end that "high lights" or white portions of film subject matter projected thereon will be concentrated on the extreme outer surface of the said "pile" facing, and the dark or "shadow" portions thereof carried deeper into the said "pile" facing by the said light beam, whereby the effect of rotundity or perspection is obtained.

Further in accordance with my invention, the foraminated facing of the "Eiderdown" material herein described is made luminous by treating, spraying or substantially impregnating the said foraminous facing with a suitable fluid having luminous properties such as a high quality aluminum paint, for example, but not to such an extent as would alter the foraminous characteristics of the herein specified material. It is to be expressly understood, however, that any other suitable fluid for producing luminosity or color, may be applied to the said foraminous facing of the projector screen herein described to impart the so called "silver screen" effect.

In the accompanying drawing, wherein like characters of reference denote corresponding parts in the different views, Figure 1 is a front elevational view of my improved projection screen, with the "pile" or "nap" facing shown removed at one corner of the screen to expose the cotton backing or porous fabric base.

Figure 1:
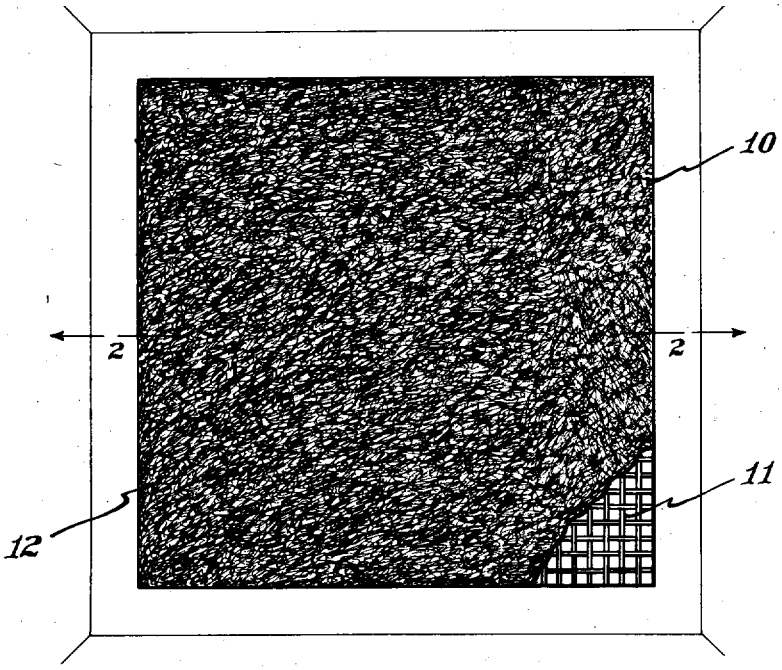
Figure 2:
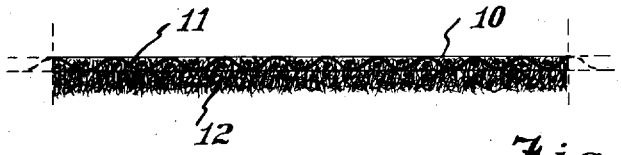
Figure 2 is a cross sectional view on the line 2—2 of Figure 1.
Figure 3:
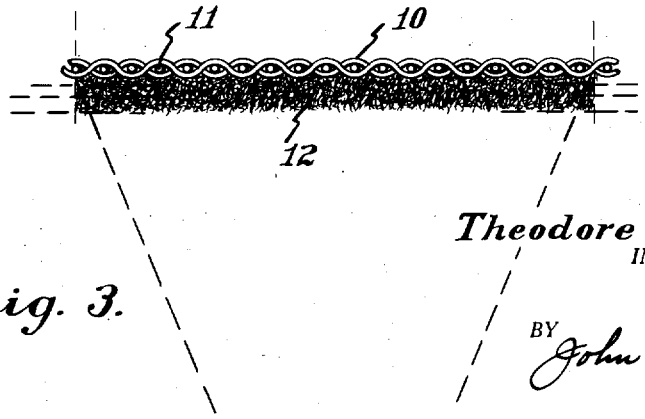
Figure 3 is a cross sectional view similar to Fig. 2 on a larger scale and illustrating, by means of the broken lines, the rays of light and a plurality of spaced transverse planes parallel with the screen, on which film subject matter is collectively projected in accordance with the depth and texture of the screen "pile" facing.

Referring to the drawing in detail, my improved projection screen consists of a suitably proportioned sheet or section of material generally indicated at 10, and commonly known as cotton back, single faced "Eiderdown" having a loosely knitted or woven porous cotton back 11, with substantial interstitial spaces therein, and which is faced with an intermeshed or otherwise secured or attached foraminated layer of "pile" or "nap" 12 comprising curled single fibers, such as wool, for example, closely tangled or interrelated and substantially irregularly disposed with respect to the plane of the cotton back 11, to provide a matted fibrous "pile" facing or "nap" having a depth greater than twice the thickness of the cotton back 11.

My improved projection screen, generally indicated at 10, presents, to projected motion pictures and the like, an image receiving surface which is substantially flat to the extent that images projected thereon by means of a film traversing light beam, for example, will appear substantially in perspective; that is to say, such images will appear to stand out in relief with a rounded out appearance due to the fact that the "high lights" and dark or "shadow" portions of film subject matter, appear on and within the "pile" or "nap" facing of the projection screen on planes varying in depth.

Preferably, the improved projection screen 10 is disposed with respect to projection apparatus (not shown) in a flat vertical plane. However, it is likewise considered within the scope of my invention to so dispose a projection screen as herein described as to present a concave or convex surface to a light beam emanating from said projection apparatus, the former having a tendency to impart greater depth or relief. This however, is not necessary, and is stated herein as an alternative screen form my invention may take.

In conformity with my invention, I utilize a suitably proportioned sheet or section of material as herein described and designated at 10, for projection screen purposes. However, it is preferable to first spray, impregnate or otherwise treat the foraminous "pile" facing 12, with a luminous pigment fluid, as aluminum paint of high grade for example, to provide a luminous foraminated screen surface. If desired, the said screen surface may be so treated a number of times to bring out any desired degree of luminosity.

In treating the herein described material for projection screen purposes, I spray, impregnate or otherwise treat the foraminous pile facing 12 as aforesaid, and then place the material on a flat surface with the pile facing 12 in contact with the surface, in order that the luminous fluid described may so concentrate and dry on the matted fibers comprising the pile facing 12 that an infinite number of exceedingly small globules of luminous fluid are collected or deposited on and throughout the fibers in a highly irregular manner and are held thereon within the depth thereof. This provides a vast number of minute, substantially spherical reflecting surfaces adapted to reflect the rays of light at various angles indiscriminately within the pile facing 12, thus producing diffusion of the reflected light.

In accordance with my invention, it is to be particularly noted that I do not limit myself to a selection of textile material as herein specified. In place of this material, any fabric or the like having a suitable backing provided with a facing of fibers, whether regularly or irregularly disposed thereon, will be satisfactory, particularly when the light diffusing globules are applied thereto in a manner to be interspersed throughout and held in place within the depth of the fibers. Furthermore, in place of textile material, a reticulate metal wire mesh may be substituted for the cotton backing 11, and a layer of plain or treated foraminated fine metal fibers or particles substituted for the "Eiderdown" facing herein described, and which may be attached in any suitable manner, to the said wire mesh, to secure results identical or similar to those herein set forth.

While I have shown and described one practical embodiment of my invention, I do not desire to be limited in the manner of securing or obtaining the superior results herein set forth, but consider myself at liberty to use all such alternative forms of material, whether fabric or metal, as fairly fall within the scope of the claims hereunto appended.

I claim:

1. A projection screen for motion pictures comprising a fabric backing and a porous pile surface, said pile surface comprising a closely matted irregularly disposed fibrous layer adapted to receive light within its depth for reflecting light beams from more than one plane.

2. A projection screen for motion pictures comprising a fabric backing and a porous pile surface, said pile surface comprising a closely matted layer of irregularly disposed metallized fibres adapted to receive light within its depth for reflecting light beams from more than one plane.

3. A projection screen for motion pictures comprising a foraminated backing, a facing of irregularly disposed closely woven fibres on said back, and a coating of metallic substantially spherical globules deposited on said fibres.

4. A projection screen for motion pictures comprising a foraminated backing, a facing of irregularly disposed closely woven fibres on said back, and a coating of metallic substantially spherical globules deposited on said fibres.

5. A projection screen for motion pictures comprising a porous base sheet faced with a substantial layer of loosely matted fibres irregularly disposed with respect to the plane of said sheet, said fibres being metallized to provide a luminous surface with an infinite number of minute, substantially spherical reflecting surfaces formed on said fibres indiscriminately throughout said surface.

6. A projection screen for motion pictures comprising a porous base sheet faced with a substantial layer of loosely matted fibres irregularly disposed with respect to the plane of said sheet, said fibres being metallized to provide a luminous porous surface with an infinite number of minute, substantially spherical reflecting surfaces carried by said fibres throughout said surface and adapted for reflecting rays of light at various angles indiscriminately within and throughout said surface.

7. A projection screen for motion pictures comprising a foraminated backing, a facing of irregularly disposed matted fibres on said backing, and a plurality of globular elements interspersed throughout said fibres for diffusing light projected onto said screen.

8. A projection screen for motion pictures comprising a fabric backing and a porous pile surface, said pile surface comprising a matted, irregularly disposed, fibrous layer adapted to receive light within its depth, and a plurality of globular light diffusing elements interspersed throughout said fibres.

THEODORE F. YAGLE.